United States Patent
Gupta

(10) Patent No.: US 11,588,864 B2
(45) Date of Patent: *Feb. 21, 2023

(54) METHOD AND APPARATUS TO SIMPLIFY REPLACING EXISTING IP PHONE WITH NEW IP PHONE USING HEADSET

(71) Applicant: Cisco Technology, Inc., San Jose, CA (US)

(72) Inventor: Ajay Kumar Gupta, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 16/774,330

(22) Filed: Jan. 28, 2020

(65) Prior Publication Data

US 2021/0234904 A1 Jul. 29, 2021

(51) Int. Cl.
*H04L 65/1069* (2022.01)
*H04M 7/00* (2006.01)
(Continued)

(52) U.S. Cl.
CPC ...... *H04L 65/1069* (2013.01); *H04L 65/1016* (2013.01); *H04L 65/1073* (2013.01);
(Continued)

(58) Field of Classification Search
CPC ....... H04L 41/12; H04L 45/00; H04L 41/082; H04L 61/2007; H04L 63/083;
(Continued)

(56) References Cited

U.S. PATENT DOCUMENTS 7,567,552 B2 * 7/2009 Lee ................... H04L 29/12009
370/352
7,945,036 B1 * 5/2011 Tonogai ............. H04M 3/4228
379/201.12
(Continued)

OTHER PUBLICATIONS

Cisco, "Connecting Your Phone", 6 pages, retrieved from Internet Nov. 12, 2019; https://www.cisco.com/en/US/docs/voice_ip_comm/cuipph/7920/5_0/english/user/guide/7920con.html.

*Primary Examiner* — Khaled M Kassim
(74) *Attorney, Agent, or Firm* — Edell, Shapiro & Finnan, LLC

(57) ABSTRACT

A call control entity communicates with Internet Protocol (IP) phones. The call control entity creates a mapping between a headset identifier of a headset connected to a registered first IP phone, and an identifier associated with the first IP phone. Upon receiving a request from a second IP phone that is not registered, the call control entity determines there is no existing IP phone record for the second IP phone. Responsive to the determining, the call control entity acquires from the second IP phone the headset identifier, and accesses an first IP phone record of the first IP phone based on the headset identifier and the mapping. The call control entity creates a second IP phone record for the second IP phone, copies existing configuration information from the first IP phone record to the second IP phone record, and configures the second IP phone with the existing configuration information.

20 Claims, 9 Drawing Sheets

(51) Int. Cl.
  *H04M 1/60* (2006.01)
  *H04L 65/1016* (2022.01)
  *H04L 65/1073* (2022.01)
  *H04L 65/1104* (2022.01)

(52) U.S. Cl.
  CPC ....... *H04L 65/1104* (2022.05); *H04M 1/6058* (2013.01); *H04M 7/006* (2013.01)

(58) Field of Classification Search
  CPC ......... H04L 67/02; H04L 45/02; H04L 45/04; H04L 41/084; H04L 65/1006; H04L 65/1073; H04L 61/6022; H04W 84/18; H04W 12/033; H04W 8/18; H04W 76/10
  See application file for complete search history.

(56) References Cited

U.S. PATENT DOCUMENTS

| | | | | |
|---|---|---|---|---|
| 8,144,692 | B2* | 3/2012 | Haddad | H04L 41/0806 |
| | | | | 370/352 |
| 8,315,876 | B2* | 11/2012 | Reuss | H04R 1/10 |
| | | | | 704/273 |
| 8,732,279 | B2* | 5/2014 | Nedeltchev | H04L 63/0892 |
| | | | | 709/220 |
| 8,819,188 | B2* | 8/2014 | Blatherwick | H04L 67/303 |
| | | | | 709/220 |
| 9,065,684 | B2* | 6/2015 | Tanizawa | H04M 7/0024 |
| 9,160,863 | B2* | 10/2015 | Morrison | H04M 3/42272 |
| 9,549,259 | B2* | 1/2017 | Reuss | H04R 5/033 |
| 9,717,106 | B2* | 7/2017 | Bell | H04W 8/205 |
| 2016/0294748 | A1* | 10/2016 | Yang | G06Q 50/01 |
| 2019/0082477 | A1* | 3/2019 | Burton | H04M 1/6066 |

* cited by examiner

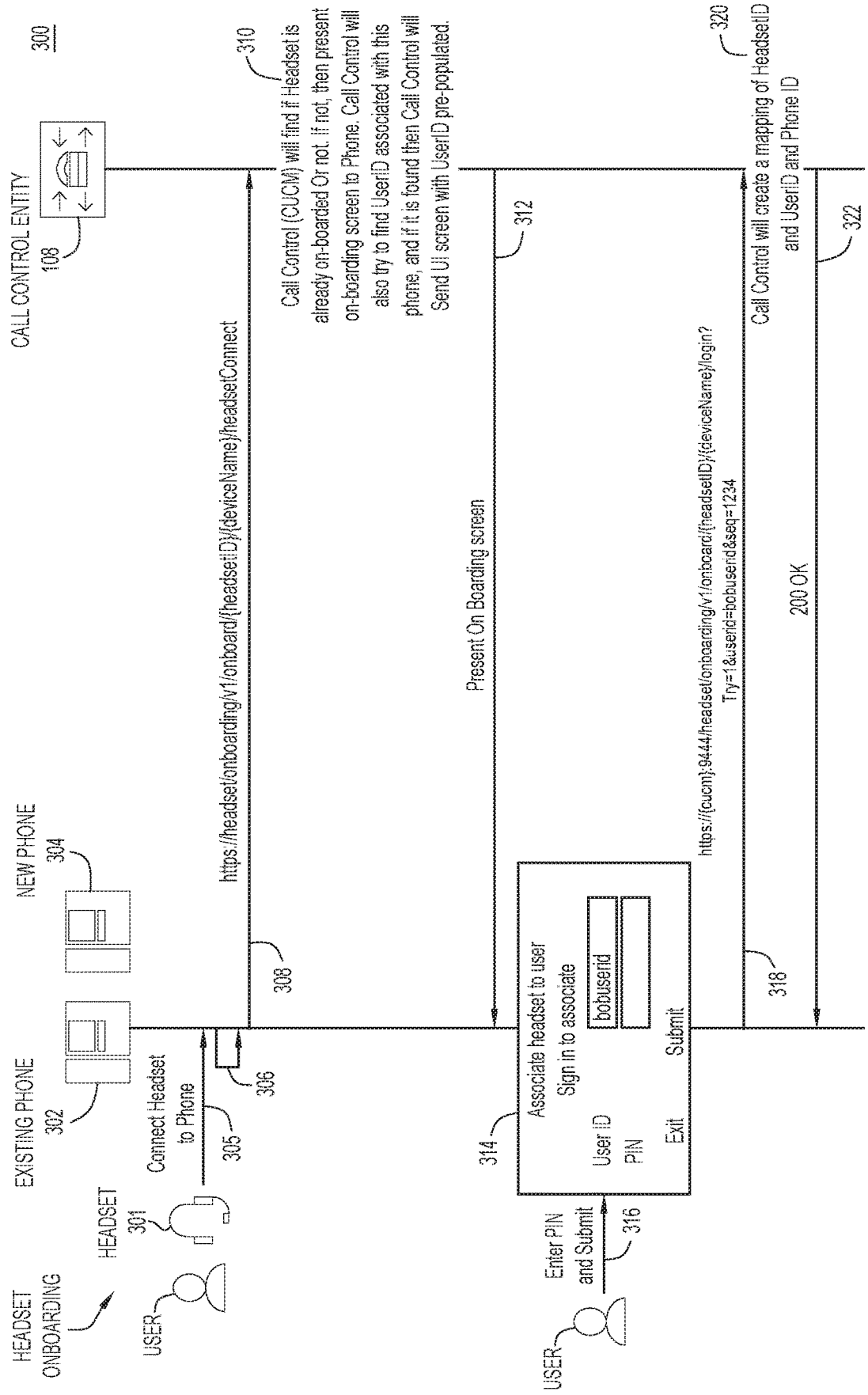

METHOD AND APPARATUS TO SIMPLIFY REPLACING EXISTING IP PHONE WITH NEW IP PHONE USING HEADSET

TECHNICAL FIELD

The present disclosure relates to replacing Internet Protocol (IP) phones.

BACKGROUND

An Internet Protocol (IP) phone, also referred to as a voice-over-IP (VoIP) phone, communicates with other IP phones over the Internet via an exchange of IP packets with the other IP phones. There are many reasons why the IP phone may need to be replaced. For example, the IP phone may no longer be functional, or the type or model of the IP phone (i.e., the IP phone model) may no longer be supported by its vendor due expiry of an end-of-support date. The IP phone may be replaced with a new IP phone using a conventional technique, which readies the new IP phone for service. For example, IP phone replacement strategy may include pre-configuring IP phones on a call control server, which is a complicated and time-consuming process that uses manual intervention.

BRIEF DESCRIPTION OF THE DRAWINGS

FIG. 3 is a transaction diagram for high-level transactions used to simplify replacement of an existing IP phone with a new IP phone based on a headset used with both of the IP phones, according to an example embodiment.

DESCRIPTION OF EXAMPLE EMBODIMENTS

Overview

Briefly, a method is provided by which a call control entity communicates with Internet Protocol (IP) phones. The method includes creating a mapping between (i) a headset identifier of a headset connected to a first IP phone registered with the call control entity, and (ii) an identifier associated with the first IP phone and by which an existing first IP phone record for the first IP phone is accessible. The method also includes, upon receiving a configuration request from a second IP phone not registered with the call control entity, determining there is no existing IP phone record for the second IP phone. The method further includes responsive to the determining, acquiring from the second IP phone the headset identifier when the headset is connected to the second IP phone. The method also includes accessing the first IP phone record based on the headset identifier and the mapping. The method includes creating a second IP phone record for the second IP phone, copying existing configuration information from the first IP phone record from the accessing to the second IP phone record. The method also includes configuring the second IP phone with the existing configuration information.

Example Embodiments

Embodiments presented herein simplify the replacement of an existing IP phone with a new IP phone using a headset (HS) for both of the IP phones. The embodiments use a headset identifier retrieved from the headset through the IP phones as a key to the replacement. The embodiments create, at a call control entity, an association between the headset (i.e., the headset identifier) and a user identifier (i.e., identity) of a user and/or a device identifier of the existing IP phone assigned to the user. The embodiments use the association to retrieve an existing IP phone record for the existing IP phone, and configure the new IP phone based on the existing IP phone record.

Figure 1:
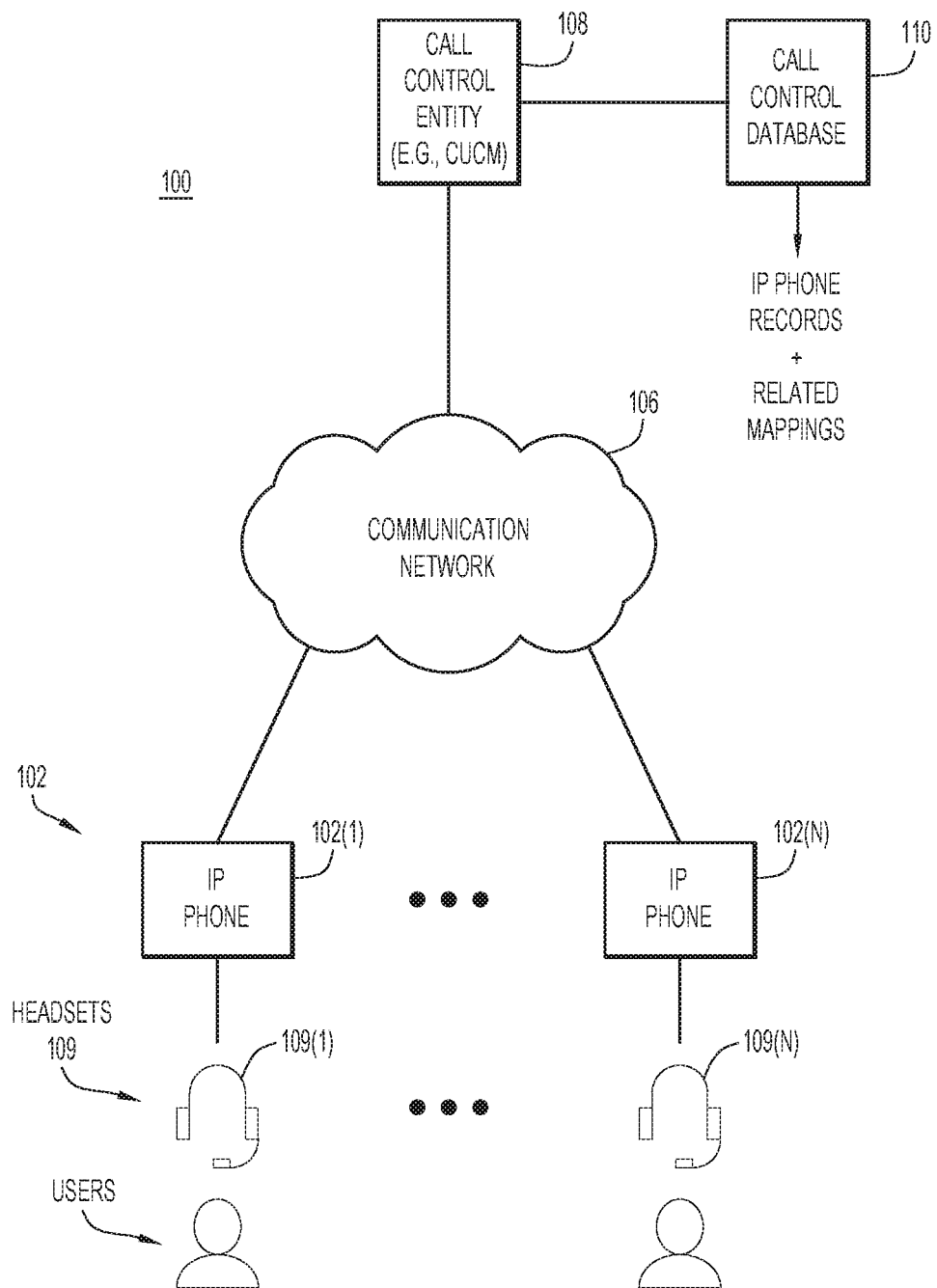
FIG. 1 is a block diagram of a network environment in which embodiments directed to simplifying IP phone replacement using a headset for the IP phones may be implemented, according to an example embodiment.

With reference to FIG. 1, there is shown an example network environment 100 in which embodiments directed to simplifying replacement of an existing IP phone with a new IP phone based on information retrieved from a headset that is used with both of the IP phones may be implemented. Network environment 100 includes Internet Protocol (IP) phones (also referred to as voice-over-IP (VoIP) phones) 102(1)-102(N) (collectively, "IP phones 102") associated with and operated by respective users. IP phones 102 may include desk phones and mobile phones. IP phones 102 are configured to connect with and communicate over a communication network 106, which may include one or more wide area networks (WANs), such as the Internet, and one or more local area networks (LANs), for example. Network environment 100 also includes a call control entity 108 (also referred to as a "call manager 108" or a "call control server 108") configured to connect to communication network 106 and communicate with IP phones 102 over the communication network. Call control entity 108 includes one or more call control servers that host applications to collectively implement a communication infrastructure to host services that provide provisioning/registering of IP phones 102, call control methods, and session management methods for the IP phones, once the IP phones have been provisioned/registered on the call control entity. In an example, call control entity 108 may include one or more components of a Cisco Uniform Communication Manager (CUCM) configured to implement the embodiments presented herein.

IP phones 102(1)-102(N) may be configured to connect directly to corresponding ones of headsets 109(1)-109(N) (collectively referred to as headsets 109) worn by users, although one or more of the IP phones may not include headsets. The connections between corresponding pairs of IP phones 102 and headsets 109 may include wired connections and/or wireless/radio connections (e.g., Bluetooth connections). A given headset 109(i) typically includes a microphone and speakers to receive and transmit audio, respectively. When IP phone 102(i) is connected to headset 109(i) worn by a user, audio associated with the IP phone, such as call audio, may be routed from the IP phone to the speakers of the headset, and from the microphone of the headset to the IP phone. Accordingly, the user may use headset 109(i) to carry on telephone conversations, listen to voicemails, and so on, at IP phone 102(i).

Each headset 109(i) includes memory to store a headset identifier that may be accessed/retrieved/read from the memory by an IP phone 102(i) connected to the headset. The headset identifier includes any unique value which may be used to differentiate the headset from other headsets, which may include headsets of the same make and/or model. Examples of the headset identifier include a serial number of the headset, a media access control (MAC) address of the headset, a Universal Serial Bus (USB) unique device identifier of the headset, a Bluetooth address of the headset, and so on. To this end, the headset identifier may include any unique software readable device identifier that has been assigned to and configured on the headset and serves the purposes described herein.

Call control entity 108 includes a call control database 110 to store IP phone records and associated headset mappings for various ones of IP phones 102 provisioned on/registered with the call control entity, and for various ones of headsets 109 connected with the IP phones, as described in connection with FIG. 2. Provisioning an IP phone on call control entity 108 includes, but is not limited to, creating a corresponding IP phone record for the IP phone in call control database 110.

Figure 2:
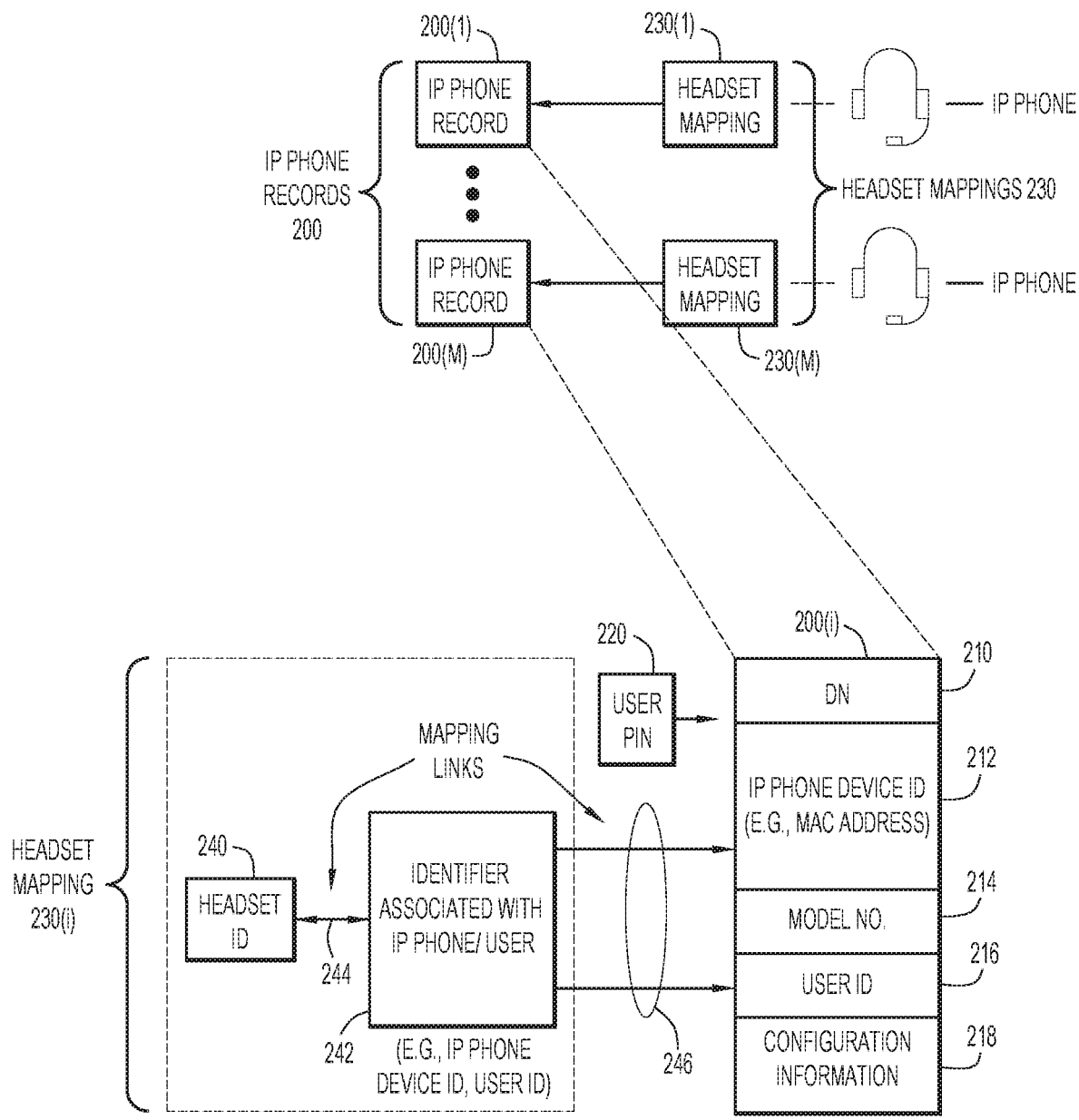
FIG. 2 is an illustration of example IP phone records and headset mappings stored in a call control database accessible to a call control entity of the network environment, according to an example embodiment.

With reference to FIG. 2, there is an illustration of example IP phone records 200(1)-200(M) (collectively referred to as "IP phone records 200") stored in call control database 110 for corresponding ones of IP phones 102 provisioned on/registered with control entity 108. Each IP phone record 200(i) corresponds to one of IP phones 102 and is associated with a corresponding user. Each IP phone record 200(i) includes: a directory number (DN) (also referred to as a "phone number") 210 assigned to the user associated with the IP phone record; an IP phone device identifier (ID) 212, such as a media access control (MAC) address of the IP phone corresponding to the IP phone record and that is provisioned on/registered with call control entity 108; a model number 214 of the IP phone; a user identifier 216 of the user; and IP phone configuration information 218 associated with the user and the IP phone and that may be used to configure the IP phone for operation. IP phone record 200(i) is shown by way of example, and the IP phone record may include more or less information. For example, directory number 210 may be omitted from the IP phone record itself, and used instead as an index or pointer to the IP phone record.

For purposes of security controlled access to IP phone record 200(i), call control database 110 may also store, and associate with the IP phone record, a predetermined personal identification number (PIN) 220 that is assigned to the user. In this case, call control entity 108 uses the user PIN to control or condition access to IP phone record 200(i) based on the user PIN, e.g., the call control entity permits access to the IP phone record only when the user PIN 220 has been presented to the call control entity.

Director number 210 assigned to the user is used to make phone calls with the IP phone, as is known. Directory number 210 may be stored in multiple (different) IP phone records corresponding to multiple (different) IP phones, and thus used to make phone calls with each of the multiple IP phones. Access to the multiple IP phone records may be controlled based on the user PIN (e.g., user PIN 220) assigned to the user who is associated with each of the IP phone records. Device identifier 212 is typically unique to the IP phone represented by the IP phone record. The collection of directory number 210, device identifier 212, and user ID 216 in IP phone record 200(i) associates the user, the directory number, and the IP phone to each other.

IP phone configuration information 218 includes IP phone configuration parameters/settings (e.g., an IP phone configuration profile) used to configure the IP phone. IP phone configuration information 218 includes user settings for options such as speed-dialing, call-forwarding, and the like. IP phone configuration information 218 includes administration settings, such as security settings, class-of-service settings, and the like. Thus, in an example, IP phone configuration information 218 includes custom IP phone configuration parameters associated with (and usually defined by) the user and that follow the user from one IP phone to another IP phone used by the user, and standard IP phone configuration parameters that are not specifically associated with the user. Examples of IP phone configuration information 218 include, but are not limited to, one or more of an IP phone button template, an IP phone soft-key template, IP phone default parameters, an IP phone profile, an IP phone recording profile, and a user identifier.

As mentioned above, call control database 110 also stores headset mappings 230(1)-230(M) (collectively referred to as headset mappings 230) associated with respective ones of IP phone records 200(1)-200(M). Headset mappings 230 are linked to/associated with corresponding ones of IP phone records 200 for corresponding ones of IP phones 102 to which the headsets have been or are connected. Headset mappings 230 provide an index or link to corresponding ones of IP phone records 200, which are thus accessible by way of the corresponding headset mappings.

An example headset mapping 230(i) linked to/associated with IP phone record 200(i) is shown at the bottom left-hand corner of FIG. 3. Headset mapping 230(i) includes (i) a headset identifier 240 of a headset that was or is connected to an IP phone identified by device identifier 212 or user identifier 216 of IP phone record 200(i), (ii) at least one identifier 242 associated with the IP phone/user of the IP phone, (iii) an association or link 244 between the headset identifier and the at least one identifier, and (iv) an association or link 246 between the at least one identifier and the IP phone record. At least one identifier 242 may include device identifier 212 of the IP phone to which the headset was or is connected, user identifier 216 of the user to which the IP phone (and the IP phone record) is assigned, or both the device identifier of the IP phone and the user identifier. At least one identifier 242 may be replaced by at least one link to the corresponding identifier in IP phone record 200(i). Thus, headset mapping 230(i) maps headset identifier 240 to IP phone record 200(i) via at least one identifier 242 (e.g., the device identifier of the IP phone and/or the user identifier).

The embodiments presented below simplify the replacement of an existing IP phone (also referred to as an "old IP phone") with a new IP phone based on a headset identifier of a headset used with the IP phones. At the time of the replacement, the existing IP phone has already been provisioned on/registered with call control entity 108 and, therefore, an existing IP phone record for the existing IP phone is stored in call control database 110. On the other hand, at the time of replacement, i.e., when the replacement process begins, the new IP phone has not yet been provisioned on/registered with call control entity 108 and, therefore, there is no new IP phone record for the new IP phone stored in call control database 110. The existing IP phone and the new IP phone may be referred to as a "first IP phone" and a "second IP phone," respectively.

Embodiments directed to simplifying replacement of the existing IP phone with the new IP phone based on the headset are described below in connection with FIGS. 3, 4A, 4B, and 5. In the ensuing description and in the figures, "IP phone" may be replaced with simply "phone."

With reference to FIG. 3, there is a transaction diagram of example transactions 300 used for one-time "onboarding" of a headset 301 (generally referred to as "headset onboarding") performed when the headset is initially connected to an existing (or "old") phone 302 already provisioned on/registered with call control entity 108 (e.g., the CUCM). The process of "onboarding" headset 301 creates in call control database 110 a headset mapping between a headset identifier of the headset and a user identifier of a user to which existing phone 302 is assigned (e.g., a "headset ID-user ID" mapping), and also between the headset identifier and the device identifier of the existing phone (e.g., a "headset ID-device ID" mapping), if the latter mapping does not already exist. The latter mapping may have been created when existing IP phone 302 was initially configured by call control entity 108, prior to when the headset onboarding is performed. Subsequently, i.e., after the onboarding of headset 301 through existing phone 302, the existing phone will be replaced with new phone 304, as described below in connection with FIGS. 4A and 4B.

At 305, a user connects headset 301 to existing phone 302. The connection enables bi-directional communication between headset 301 and existing phone 302. Sensing the connection, at 306, existing phone 302 initiates the headset onboarding process locally and, in response, retrieves from headset 301 information, including the headset identifier and a device name of the headset. At 308, existing phone 302 sends to call control entity 108 a request to initiate headset onboarding (i.e., sends a headset onboarding request to the call control entity to have the call control entity onboard headset 301). The request includes the headset identifier, a headset device name, an indicator that the headset is connected to the existing phone, a device identifier of existing phone 302, and an indication that the request is to initiate headset onboarding. In an example, the request may be in the form of a HyperText Transfer Protocol (HTTP) request that includes a URL to a headset onboarding service hosted on call control entity 108. Call control entity 108 receives the request.

Responsive to the request, call control entity 108 initiates onboarding of headset 301. Specifically, at 310, call control entity 108 determines whether headset 301 has already been onboarded, e.g., whether the headset identifier has already been mapped to an existing IP phone record for existing phone 302 in call control database 110. To do this, call control entity searches call control database 110 for an existing mapping between the headset identifier and the device identifier for existing phone 302, or a user identifier for the user assigned to the existing phone. If headset 301 has already been onboarded, e.g., the existing mapping exists, the onboarding process ends.

On the other hand, if headset 301 has not been onboarded, e.g., no existing mapping exists, call control entity 108 continues with the onboarding process. At 312, call control entity sends to existing phone 302 instructions to cause the existing phone to present on a screen of the existing phone a headset-onboarding user interface (UI). For example, call control entity 108 sends to existing phone 302 a configuration file including the UI. The UI includes a prompt to enter a user identifier already associated with existing phone 302 and, optionally, a prompt to enter a user PIN associated with the user identifier. In addition, call control entity 108 may search call control database 110 for the user identifier and, if found, prepopulate the prompt for the user identifier with the found user identifier. Existing phone 302 receives the UI from call control entity 108.

Responsive to the UI from call control entity 108, at 314, existing phone 302 presents the UI on the screen of the existing phone. The UI includes the prompt for the user identifier and, optionally, the prompt for the user PIN. At 316, the user enters into existing phone 302 the user identifier and, optionally, the user PIN, if requested. Responsive to entry of the information, at 318, existing phone 302 sends to call control entity 108 a request to complete the onboarding process. The request includes the headset identifier, the device name, the user identifier, and an indication that the request is for headset onboarding. The request may be in the form of an HTTP request that includes the URL of the onboarding service hosted on call control entity 108. Call control entity 108 receives the request.

Responsive to the request, at 320, call control entity 108 creates a mapping between the headset identifier and the user identifier. Call control entity 108 may also create a mapping between the headset identifier and the device identifier of existing phone 302, if not already present. The mappings also link the headset identifier to the existing IP phone record of existing phone 302. At 322, call control entity 108 sends to phone 304 a status message indicating success of onboarding (e.g., an HTTP 200—OK). New phone 304 receives the status message indicating success.

In summary, the headset onboarding process of FIG. 3 creates in call control database 110 mappings of the headset identifier, the user identifier, and the device identifier (of existing phone 302) to each other and to the existing IP phone record for the existing phone.

Figure 4A:
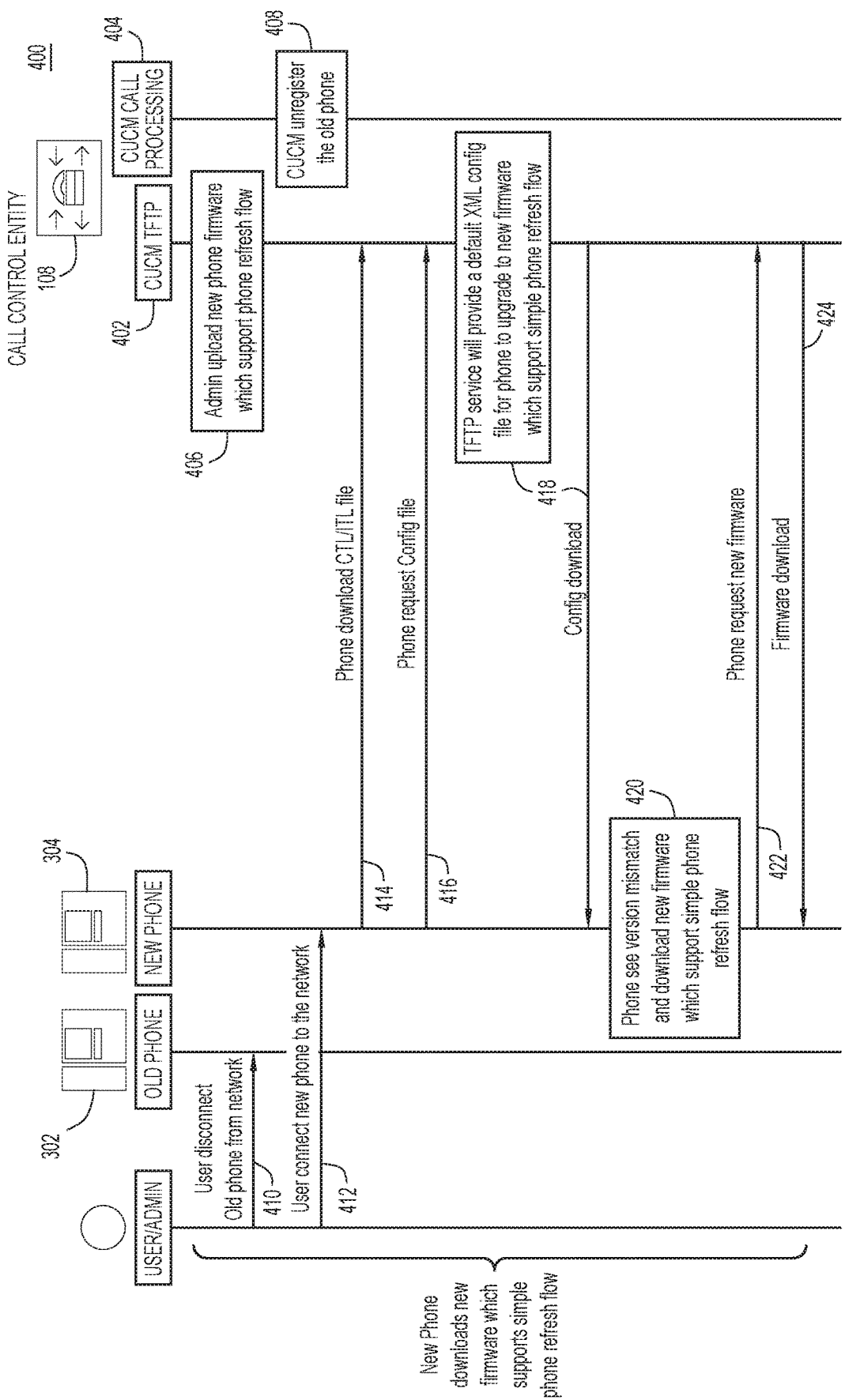
FIGS. 4A and 4B collectively represent a transaction diagram for detailed transactions used to simplify the replacement of the existing IP phone with the new IP phone based on the headset, according to an example embodiment.
Figure 4B:
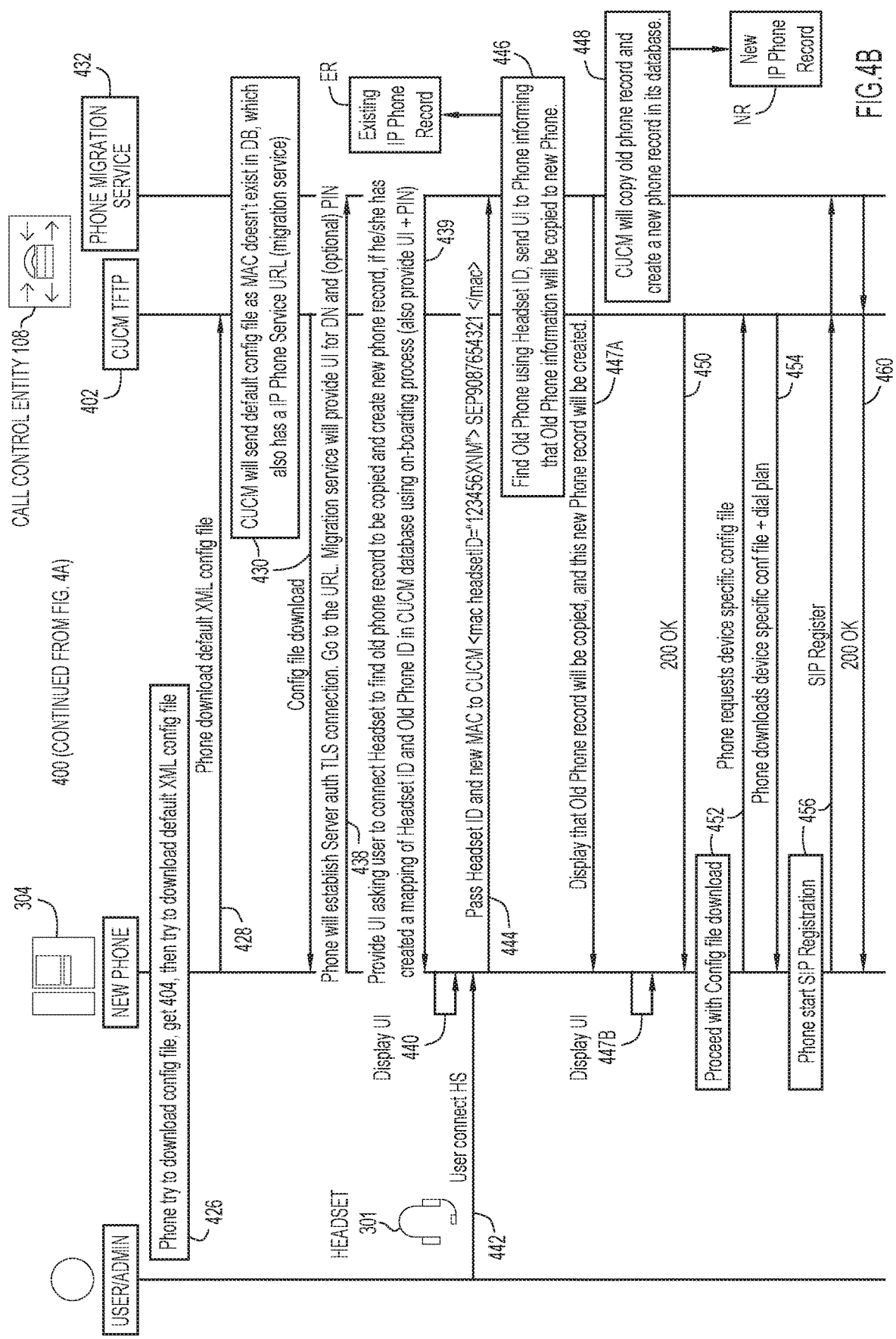

With reference to FIGS. 4A and 4B, there is a transaction diagram of detailed example transactions 400 used to simplify the replacement of existing phone 302 with a new phone 304 using headset 301. The replacement, e.g., transactions 400, occurs after headset 301 has already been onboarded, as described above in connection with FIG. 3. In the example of FIGS. 4A and 4B, call control entity 108 includes a CUCM Trivial File Transfer Protocol (TFTP) service/server 402 (simply referred to as "TFTP 402") and a CUCM call processing module 404 (simply referred to as "Call Processing" 404).

Referring first to FIG. 4A, at 406, an administrator uploads to call control entity 108 (e.g., TFTP 402) new phone firmware, which supports a new phone refresh flow, i.e., initial processing for new phone 304. At 408, call control entity 108 (e.g., Call Processing 404) unregisters existing phone 302 from the call control entity. It is understood, however, that existing phone 302 may or may not be active with call control entity 108 during the replacement process with new phone 304, and, in one example, may have been removed physically from its initial location of deployment prior to the commencement of the replacement process; however, in the example of FIG. 4A, the existing phone 302 is available and connected with communication network 106 when the replacement process begins.

At 410, the user disconnects existing (or "old") phone 302 from communication network 106. For example, assuming existing phone 302 includes a network connection cable connected to a local connector, such as an Ethernet connector, proximate existing phone 302, the user unplugs the network connection cable from the local connector. At 412, the user connects new phone 304 to the communication network. For example, the user connects, i.e., plugs a network connection cable of new phone 304 into the local connector so that the new phone 304 can access communication network 106.

At 414, new phone 304 downloads a Certificate Trust List (CTL) and Identity Trust List (ITL) file from call control entity 108. For example, call control entity 108 (e.g., TFTP 402) sends the CTL/ITL file to new phone 304. At 416, new phone 304 sends, and call control entity 108 (e.g., TFTP 402) receives from the new phone, a first configuration request for a configuration file with which to configure the new phone. The first configuration request includes a new MAC address of the new phone that differs from an existing MAC address of the existing phone. The new MAC address is not known to call control entity because the new phone has not yet been configured on the call control entity. Responsive to the first configuration request, and because the new MAC address is not known to call control entity 108, at 418, the call control entity (e.g., TFTP 402) sends to new phone 304 a default/common configuration file (e.g., an Extensible Markup Language (XML) file) for the phone to upgrade to the new firmware, which supports the phone refresh flow. Phone refresh is the process of migrating existing IP phone configuration information from existing phone 302 to new phone 304, as described below.

At 420, new phone 304 receives and executes the default configuration file, and determines there is a version mismatch between current firmware in the new phone and a new version of firmware that is available for the new phone.

At 422, new phone 304 sends, and call control entity 108 (e.g., TFTP 402) receives, a firmware request for the new firmware. In response, at 424, call control entity 108 (e.g., TFTP 402) sends the new firmware to new phone 304, which receives the new firmware.

Referring next to FIG. 4B, at 426, new phone 304 receives and upgrades to the new firmware. Next, new phone 304 unsuccessfully attempts to download a configuration file with which to configure the new phone, and thus receives an error message (e.g., HTTP message 404—page/server not found). Responsive to the error message, at 428, new phone 304 sends to call control entity 108 (e.g., TFTP 402) a second configuration request for a default configuration file. The second configuration request also includes the new MAC address of new phone 304. Call control entity 108 receives the second configuration request.

Responsive to the second configuration request, at 430, call control entity 108 searches IP phone records 200 in call control database 110 for an existing IP phone record that includes the new MAC address. Call control entity 108 does not find a match because new phone 304 has not yet been provisioned on/registered with the call control entity. That is, based on the new MAC address provided by the new phone, call control entity 108 determines there is no existing IP phone record for new phone 304 in call control database 110. In response, call control entity 108 accesses, and sends to new phone 304, a default configuration file configured to cause the new phone to execute a provisioning procedure for the new phone, as described below. The default configuration file provided by call control entity 108 includes a Uniform Resource Locator (URL) for a phone migration service 432 hosted/implemented on call control entity 108 and that new phone 304 is to access to become configured, as described below.

At 438, responsive to the new configuration file, a secure network connection is established between new phone 304 and call control entity 108 (e.g., phone migration service 432) over communication network 106, such as a server authorization Transport Layer Security (TLS) connection. Either new phone 304 or call control entity 108 may initiate establishment of the secure connection using any known or hereafter developed technique for establishing the secure connection. For example, the technique may rely on a phone manufacturing-installed certificate as an authentication credential, and/or a root trust certificate that is pre-installed, or that is retrieved through some secure means on the phone, to authenticate a call control server of call control entity 108. Subsequent message exchanges among next transactions 439-460 are performed over the secure network connection.

Also at 438, new phone 304 executes the URL to access/request a resource, e.g., a Webpage, from phone migration service 432. In response to the request from new phone 304, at 439, call control entity 108 (e.g., phone migration service 432) provides to new phone 304 user interface (UI) information/instructions that, when executed by the new phone, cause the new phone to generate/display at least a prompt requesting the user to connect a headset (e.g., previously onboarded headset 301) to the new phone. Other prompts may include prompts for the user to enter (i) a directory number associated with the user and that is to be used to make calls with the new phone, and (ii) optionally, the user PIN. The UI instructions provided by call control entity 108 may simply be the UI itself, which new phone 304 displays.

At 440, new phone 304 executes the UI information/instructions. As a result, new phone 304 displays at least the prompt asking the user to connect the headset. New phone 304 may also display other prompts mentioned above, e.g., for entry of the directory number and, optionally, the user PIN. Responsive to the prompt(s), at 442, the user connects headset 301 to new phone 304, and enters other information if/when prompted to do so. In response to the headset being connected to new phone 304, at 444, new phone 304 retrieves the headset identifier from headset 301, and sends to call control entity 108 (e.g., phone migration service 432) a message including the headset identifier and a new MAC address of new phone 304.

At 446, call control entity 108 (e.g., phone migration service 432) searches IP phone records 200 in call control database 110 for an existing IP phone record based on the headset identifier for headset 301 that was sent from new phone 304, and received at the call control entity, at 444. For example, call control entity 108 searches headset mappings 230 stored in call control database 110 for a mapping between the headset identifier and the user identifier assigned to existing phone 302 and/or the device identifier of the existing phone, which in turn map to the existing IP phone record of the existing IP phone. As a result of the search, call control entity 108 finds an existing IP phone record (depicted at ER in FIG. 4B) for existing phone 302 that was created when the existing phone was initially configured by call control entity 108.

When call control entity 108 finds/identifies the existing IP phone record, at 447A, call control entity 108 sends to new phone 304 a message including a UI to be displayed at the new phone. The UI indicates to the user that a new IP phone record for new phone 304 will be created based on the existing IP phone record for existing phone 302. For example, the UI may inform the user that the new IP phone record for new phone 304 will be created, and existing configuration information from the existing IP phone record for existing phone 302 will be copied into the new IP phone record. The UI may also include device identifiers for new phone 304 and existing phone 302. At 447B, new phone 304 displays the UI.

Also, when call control entity 108 finds/identifies the existing IP phone record, at 448, call control entity 108 creates the new IP phone record (depicted at NR in FIG. 4B) for new phone 304 in call control database 110. Call control entity 108 copies existing IP phone configuration information from the existing IP phone record into the new IP phone record, optionally adjusts configuration settings to suite the new phone 304, and marks the existing IP phone record for deletion. Call control entity 108 generates an audit log to record the aforementioned events/transactions. At 450, call control entity 108 generates and sends to new phone 304 a status message indicating success (e.g., an HTTP message 200—OK). New phone 304 receives the status message indicating success.

Responsive to receipt of the status message indicating success, at 452, new phone 304 generates and sends to call control entity 108 a third configuration request for specific IP phone configuration information with which to configure the new phone, and call control entity 108 receives the third configuration request.

Responsive to receipt of the third configuration request, at 454, call control entity 108 sends to new phone 304 the existing IP phone configuration information from the existing IP phone record, including modifications thereto, along with a dial plan. For example, call control entity 108 may generate a configuration file including the aforementioned information, and send the configuration file to new phone 304. New phone 304 receives the existing IP phone configuration information and dial plan. The existing configuration includes the information listed above in connection with FIG. 2. New phone 304 configures itself with the existing IP phone configuration information.

Responsive to receipt of the existing IP phone configuration information and dial plan, at 456, new phone 304 initiates Session Initiation Protocol (SIP) registration with call control entity 108 and exchanges messages with the call control entity to complete the registration of the new phone with the call control entity. SIP registration enables new phone 304 to make and receive calls using the directory number. When SIP registration is complete, at 460, call control entity 108 generates and sends to new phone 304 a status message indicating success (e.g., an HTTP 200—OK).

Figure 5:
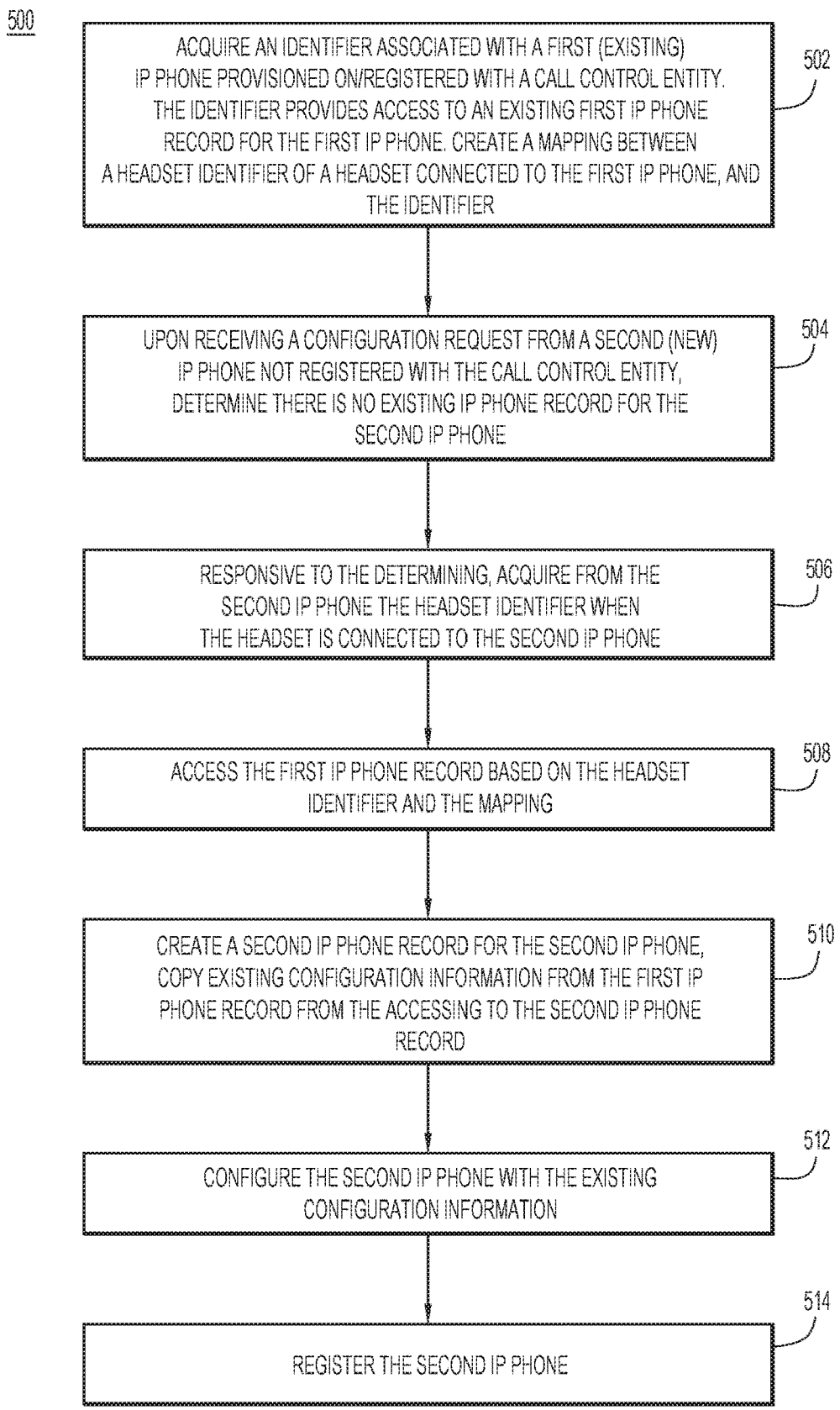
FIG. 5 is a flowchart of an example method of simplifying the replacement of the existing IP phone with the new IP phone based on the headset, performed by the call control entity, according to an example embodiment.

With reference to FIG. 5, there is a flowchart of an example method 500 of simplifying the replacement of an existing IP phone (also referred to as a "first IP phone") (e.g., first phone 302) that is provisioned on/registered with call control entity 108 with a new IP phone (also referred to as a "second IP phone") (e.g., second phone 304) that is not provisioned on/registered with call control entity 108, based on information from a headset used with both of the IP phones. Method 500 is performed primarily by call control entity 108, and includes various operations/transactions described above. As described above, call control entity 108 communicates with IP phones 102 over communication network 106.

At 502, call control entity 108 acquires from the first (existing) IP phone already provisioned on/registered with the call control entity an identifier associated with the first IP phone and by which an existing first IP phone record for the first IP phone in call control database 110 is accessible. When combined with a "mapping" defined below, the identifier serves as a "record identifier/locator" for the existing first IP phone record. Call control entity 108 creates in call control database 110 a mapping between (i) a headset identifier of a headset connected to the first (existing) IP phone, and (ii) the identifier. The identifier may include a user identifier of a user to which the first IP phone is assigned and/or a first device identifier of the first IP phone (e.g., a first MAC address of the first IP phone).

In an example, 502 may include the following headset onboarding operations:
  a. Receiving from the first IP phone a headset onboarding request when the headset is connected to the first IP phone, wherein the headset onboarding request includes the headset identifier.
  b. Responsive to the headset onboarding request, sending to the first IP phone a UI to be displayed by the first IP phone and that requests entry of the user identifier.
  c. Responsive to receiving from the first IP phone the user identifier as entered at the first IP phone in response to display of the UI, creating the mapping between the headset identifier and the user identifier.

In another example, 502 may include the following operations performed when initially configuring/provisioning the first IP phone:
  a. Acquiring from the first IP phone the first device identifier (e.g., the MAC address) of the first IP phone.
  b. Creating the mapping between the headset identifier and the first device identifier of the first IP phone.

At 504, call control entity 108 receives a configuration request from the second (new) IP phone. The configuration request may include a second device identifier of the second IP phone. Responsive to the configuration request, call control entity 108 determines there is no existing IP phone record for the second IP phone. For example, call control entity searches call control database 110 for a matching IP phone record for the second IP phone based on the second device identifier, but does not find any matching IP phone record.

At 506, responsive to the determining, call control entity acquires from the second IP phone the headset identifier of the headset when the headset is connected to the second IP phone.

At 508, responsive to acquiring the headset identifier at 506, call control entity 108 accesses the first IP phone record based on the headset identifier and the mapping from 502. To access the first IP phone record, call control entity searches call control database 110 using the headset identifier and the mapping, i.e., searches mappings (to IP phone records) in the call control database.

At 510, responsive to accessing the first IP phone record, call control entity creates a second IP phone record for the second IP phone, copies existing configuration information from the first IP phone record from the accessing to the second IP phone record, and optionally modifies the configuration information to suit the second IP phone.

At 512, call control entity 108 configures the second IP phone with the existing configuration information, and optionally modified configuration information.

At 514, call control entity 108 registers the second IP phone.

Figure 6:
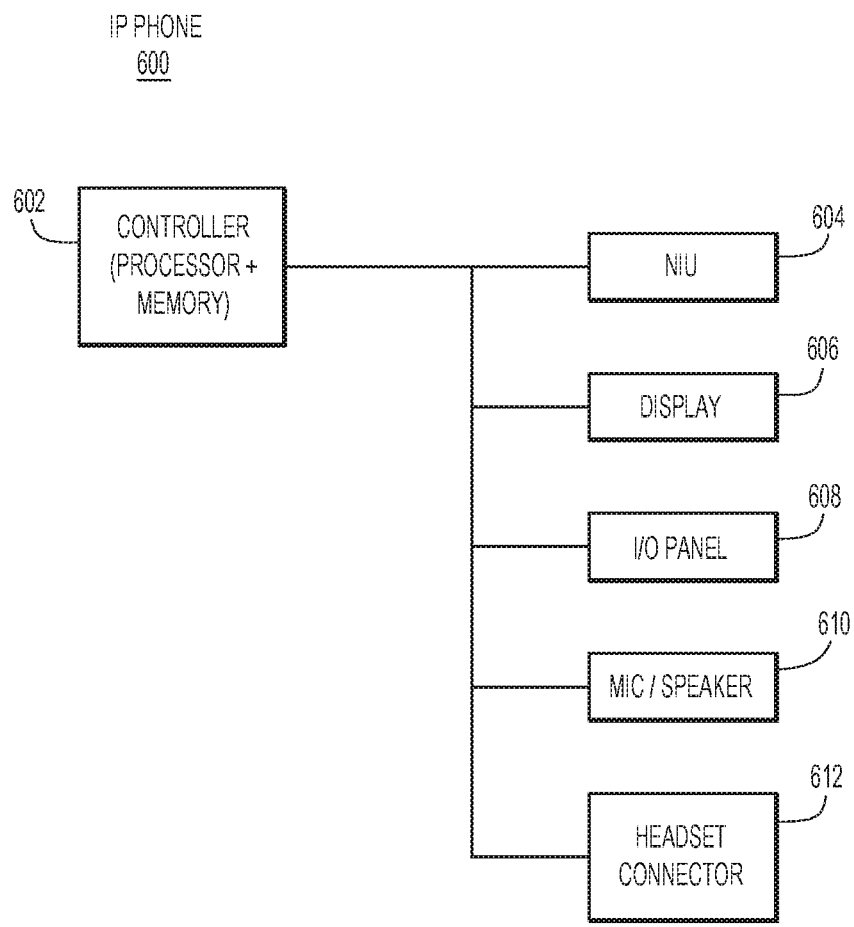
FIG. 6 is a high-level block diagram of an IP phone, according to an example embodiment.

With reference to FIG. 6, there is a high-level block diagram of an example IP phone 600 representative of any of IP phones 102, 302, and 304. IP phone 600 includes the following components that are electrically and communicatively coupled with each other: a controller 602, having a processor and memory, for controlling the IP phone; a network interface unit (NIU) 604, which may include, e.g., an Ethernet card, to provide wired or wireless communications with a network, e.g., to send/receive data packets to/from the network; a display 606 for displaying information; an input/output (I/O) panel 608, such as a keypad, for entering information into the IP phone; microphone (MIC)/ loudspeaker (SPKR) circuits 610, and an audio/signal connector 612 for a headset. The processor of controller 602 executes instructions of control logic stored in the associated memory to perform operations associated with a new IP phone that is to replace an existing IP phone, as described above.

Figure 7:
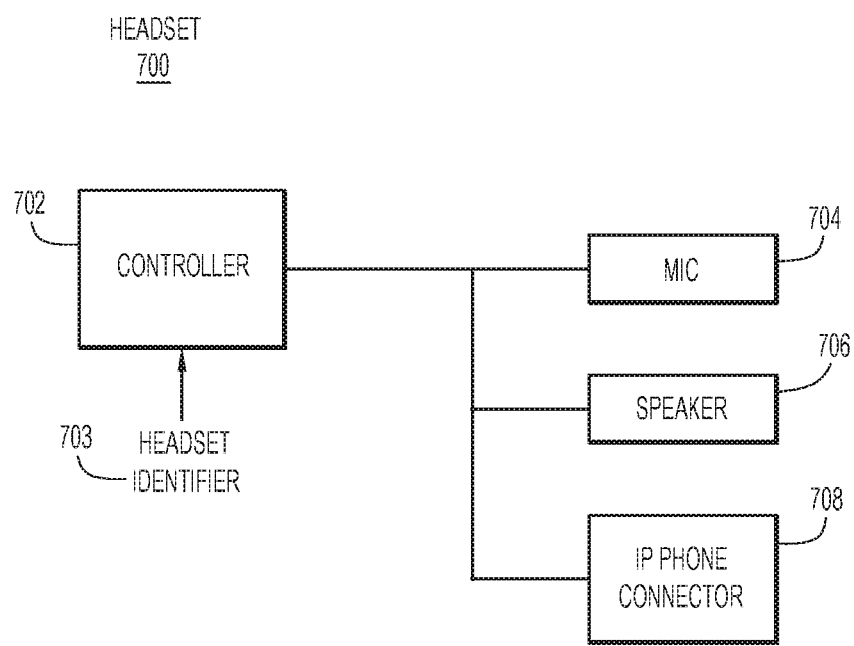
FIG. 7 is high-level block diagram of a headset for use with the IP phone, according to an example embodiment.

With reference to FIG. 7, there is a high-level block diagram of an example headset 700 representative of any of headsets 109. Headset 700 includes the following components that are electrically and communicatively connected to each other: a controller 702 including memory to store a headset identifier 703; a microphone 704, speakers 706, and an audio/signal connector 708 for connecting with a headset connector of an IP phone.

Figure 8:
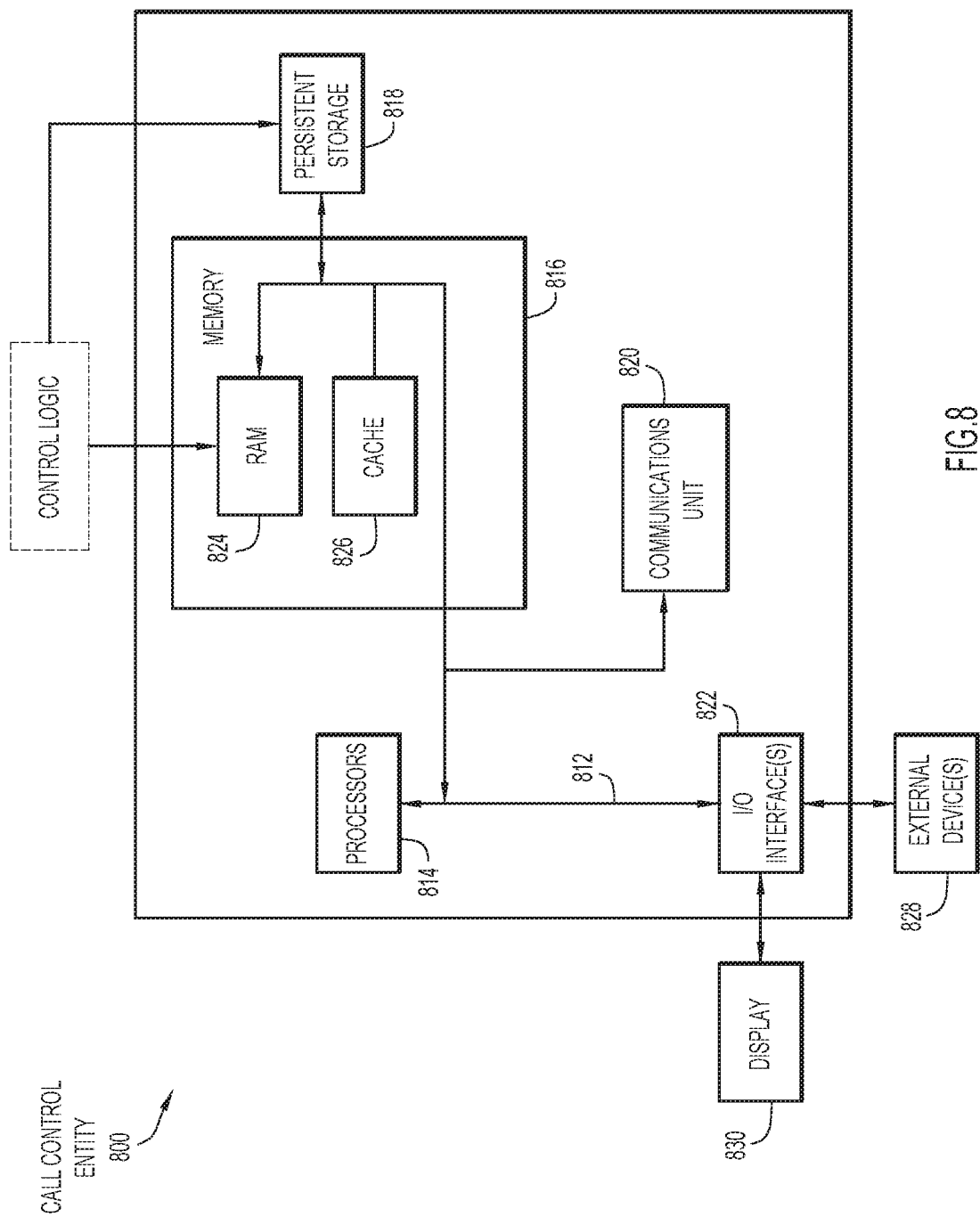
FIG. 8 is an illustration of a hardware block diagram of a computing device that may perform the functions of the call control entity, according to an example embodiment.

FIG. 8 illustrates a hardware block diagram of a computing device 800 that may perform the functions of call control entity 108 (or servers of the call control entity) referred to herein. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for control logic may be stored in memory 816 or persistent storage 818 for execution by processor(s) 814. Execution of the control logic causes the processors to implement/perform the operations and methods of the various embodiments described herein, for example, operations associated with transactions 300 and 400 and method 500, for example.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes a network interface unit with one or more network interface cards (e.g., an NIU). Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In summary, headsets are being used more and more in open space work environment today. Embodiments presented herein use a headset as user identification to simplify IP phone replacement by simply connecting the headset to a new IP phone, which allows a call control server/entity to automatically create in a local call control database a new IP phone record for the new IP phone from an existing IP phone record for an existing IP phone that was previously used with the headset. This reduces administrator burden with respect to pre-configuring IP phones in the call control entity.

The embodiments create, at the call control entity, an association between the headset of a user and a user identifier (i.e., identity) of the user and/or a device identifier of the existing IP phone assigned to the user. The embodiments use the association to retrieve the existing IP phone record for the existing IP phone, and configure the new IP phone based on the existing IP phone record. There a several ways to create the association, as follows:

a. The user connects his/her headset into the existing IP phone and completes a one-time login which results in entry of the user identifier and a user personal identification number (PIN) at the existing IP phone, which the existing IP phone forwards to the call control entity. The existing IP phone also provides to the call control entity a headset identifier (e.g., headset serial number) of the headset. The call control entity creates the mapping between the user identifier and the headset identifier, and by which the existing IP phone record is accessible.

b. If the existing IP phone is assigned to the user at the call control entity (as evidenced, for example, by the presence of the user identifier of the user in the existing IP phone record for the existing IP phone), when the user uses the headset with the existing IP phone, the existing IP phone securely sends a message to the call control entity, which creates the association between the user identifier and the headset identifier.

c. When the user uses the headset with the existing IP phone, the IP phone securely sends to the call control entity a message to create the association between the device identifier of the existing IP phone and the headset.

In one aspect, a method is provided comprising: at a call control entity configured to communicate with Internet Protocol (IP) phones over a network: creating a mapping between (i) a headset identifier of a headset connected to a first IP phone registered with the call control entity, and (ii) an identifier associated with the first IP phone and by which an existing first IP phone record for the first IP phone is accessible; upon receiving a configuration request from a second IP phone not registered with the call control entity, determining there is no existing IP phone record for the second IP phone; responsive to the determining, acquiring from the second IP phone the headset identifier when the headset is connected to the second IP phone; accessing the first IP phone record based on the headset identifier and the mapping; creating a second IP phone record for the second IP phone, and copying existing configuration information from the first IP phone record to the second IP phone record; and configuring the second IP phone with the existing configuration information.

In another aspect, an apparatus is provided comprising: a network interface unit configured to communicate with Internet Protocol (IP) phones over a network; and a processor coupled to the network interface unit and configured to perform: creating a mapping between (i) a headset identifier of a headset connected to a first IP phone registered with a call control entity, and (ii) an identifier associated with the first IP phone and by which an existing first IP phone record for the first IP phone is accessible; upon receiving a configuration request from a second IP phone not registered with the call control entity, determining there is no existing IP phone record for the second IP phone; responsive to the determining, acquiring from the second IP phone the headset identifier when the headset is connected to the second IP phone; accessing the first IP phone record based on the headset identifier and the mapping; creating a second IP phone record for the second IP phone, and copying existing configuration information from the first IP phone record to the second IP phone record; and configuring the second IP phone with the existing configuration information.

In yet another aspect, a computer readable medium is provided. The computer readable medium is encoded with instructions that, when executed by a processor, cause the process to perform cause the processor to perform: creating a mapping between (i) a headset identifier of a headset connected to a first IP phone registered with the call control entity, and (ii) an identifier associated with the first IP phone and by which an existing first IP phone record for the first IP phone is accessible; upon receiving a configuration request from a second IP phone not registered with the call control entity, determining there is no existing IP phone record for the second IP phone; responsive to the determining, acquiring from the second IP phone the headset identifier when the headset is connected to the second IP phone; accessing the first IP phone record based on the headset identifier and the mapping; creating a second IP phone record for the second IP phone, and copying existing configuration information from the first IP phone record to the second IP phone record; and configuring the second IP phone with the existing configuration information.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a call control entity configured to communicate with Internet Protocol (IP) phones:
creating a mapping between (i) a headset identifier of a headset connected to a first IP phone registered with the call control entity, and (ii) an identifier associated with the first IP phone and by which an existing first IP phone record for the first IP phone is accessible;
upon receiving a configuration request from a second IP phone not registered with the call control entity, determining there is no existing IP phone record for the second IP phone;
responsive to the determining, acquiring from the second IP phone the headset identifier when the headset is connected to the second IP phone;
accessing the first IP phone record based on the headset identifier and the mapping;
creating a second IP phone record for the second IP phone, and copying existing configuration information from the first IP phone record to the second IP phone record; and
configuring the second IP phone with the existing configuration information.

2. The method of claim 1, wherein the creating the mapping includes creating the mapping between the headset identifier and one or more of a user identifier of a user to which the first IP phone is assigned and a first device identifier of the first IP phone.

3. The method of claim 2, further comprising:
acquiring from the first IP phone the user identifier,
wherein the creating the mapping includes creating the mapping between the headset identifier and the user identifier.

4. The method of claim 3, wherein the acquiring from the first IP phone the user identifier includes:
receiving from the first IP phone a headset onboarding request when the headset is connected to the first IP phone, wherein the headset onboarding request includes the headset identifier;
responsive to the headset onboarding request, sending to the first IP phone a user interface to be displayed by the first IP phone and that requests entry of the user identifier; and
responsive to receiving from the first IP phone the user identifier as entered at the first IP phone, performing the creating the mapping.

5. The method of claim 3, wherein the acquiring from the second IP phone the headset identifier includes:
sending to the second IP phone a default configuration file including a user interface to be displayed by the second IP phone and that requests entry of the user identifier;
establishing with the second IP phone a secure connection over a network; and
receiving the user identifier from the second IP phone over the secure connection.

6. The method of claim 3, wherein:
the acquiring from the first IP phone the user identifier further includes acquiring from the first IP phone a personal identification number (PIN) for the user; and
the method further comprises conditioning access to the first IP phone record using the PIN.

7. The method of claim 2, further comprising:
acquiring from the first IP phone the first device identifier of the first IP phone,
wherein the creating the mapping includes creating the mapping between the headset identifier and the first device identifier of the first IP phone.

8. The method of claim 2, wherein:
the configuration request from the second IP phone includes a second device identifier of the second IP phone; and
the determining there is no existing IP phone record for the second IP phone includes searching IP phone records of a call control database based on the second device identifier, wherein the IP phone records include respective device identifiers of respective IP phones.

9. The method of claim 8, wherein the accessing the first IP phone record includes:
searching the IP phone records based on the headset identifier from the acquiring and the mapping.

10. The method of claim 1, further comprising:
responsive to the accessing the first IP phone record for the first IP phone, sending to the second IP phone a user interface to be displayed by the second IP phone, wherein the user interface indicates that the second IP phone record for the second IP phone will be created and be based on the first IP phone record for first IP phone.

11. The method of claim 1, wherein the existing configuration information includes one or more of an IP phone button template, an IP phone soft-key template, IP phone default parameters, an IP phone profile, an IP phone recording profile.

12. The method of claim 1, further comprising:
after the configuring the second IP phone, performing session initiation protocol (SIP) registration of the second IP phone.

13. An apparatus comprising:
a network interface unit configured to communicate with Internet Protocol (IP) phones over a network; and
a processor coupled to the network interface unit and configured to perform:
creating a mapping between (i) a headset identifier of a headset connected to a first IP phone registered with a call control entity, and (ii) an identifier associated with the first IP phone and by which an existing first IP phone record for the first IP phone is accessible;
upon receiving a configuration request from a second IP phone not registered with the call control entity, determining there is no existing IP phone record for the second IP phone;
responsive to the determining, acquiring from the second IP phone the headset identifier when the headset is connected to the second IP phone;
accessing the first IP phone record based on the headset identifier and the mapping;
creating a second IP phone record for the second IP phone, and copying existing configuration information from the first IP phone record to the second IP phone record; and
configuring the second IP phone with the existing configuration information.

14. The apparatus of claim 13, wherein the processor is configured to perform the creating the mapping by creating the mapping between the headset identifier and one or more of a user identifier of a user to which the first IP phone is assigned and a first device identifier of the first IP phone.

15. The apparatus of claim 14, wherein the processor is further configured to perform:
acquiring from the first IP phone the user identifier, wherein the processor is configured perform the creating the mapping by creating the mapping between the headset identifier and the user identifier.

16. The apparatus of claim 15, wherein the processor is configured to perform the acquiring from the first IP phone the user identifier by:
receiving from the first IP phone a headset onboarding request when the headset is connected to the first IP phone, wherein the headset onboarding request includes the headset identifier;
responsive to the headset onboarding request, sending to the first IP phone a user interface to be displayed by the first IP phone and that requests entry of the user identifier; and
responsive to receiving from the first IP phone the user identifier as entered at the first IP phone, performing the creating the mapping.

17. The apparatus of claim 15, wherein the processor is configured to perform the acquiring from the second IP phone the headset identifier by:
sending to the second IP phone a default configuration file including a user interface to be displayed by the second IP phone and that requests entry of the user identifier;
establishing with the second IP phone a secure connection over a network; and
receiving the user identifier from the second IP phone over the secure connection.

18. A non-transitory computer readable medium encoded with instructions that, when executed by a processor of a call control entity configured to communicate with Internet Protocol (IP) phones, cause the processor to perform:
creating a mapping between (i) a headset identifier of a headset connected to a first IP phone registered with the call control entity, and (ii) an identifier associated with the first IP phone and by which an existing first IP phone record for the first IP phone is accessible;
upon receiving a configuration request from a second IP phone not registered with the call control entity, determining there is no existing IP phone record for the second IP phone;
responsive to the determining, acquiring from the second IP phone the headset identifier when the headset is connected to the second IP phone;
accessing the first IP phone record based on the headset identifier and the mapping;
creating a second IP phone record for the second IP phone, and copying existing configuration information from the first IP phone record to the second IP phone record; and
configuring the second IP phone with the existing configuration information.

19. The non-transitory computer readable medium of claim 18, wherein the instructions to cause the processor to perform the creating the mapping include instructions to cause the processor to perform creating the mapping between the headset identifier and one or more of a user identifier of a user to which the first IP phone is assigned and a first device identifier of the first IP phone.

20. The non-transitory computer readable medium of claim 19, further comprising instructions to cause the processor to perform:
acquiring from the first IP phone the user identifier, wherein the creating the mapping includes creating the mapping between the headset identifier and the user identifier.

* * * * *